United States Patent [19]

Irie

[11] Patent Number: 5,321,488
[45] Date of Patent: Jun. 14, 1994

[54] INTER-VEHICLE DISTANCE DETECTING DEVICE

[75] Inventor: Tatsuji Irie, Himeji, Japan

[73] Assignee: Mitsubishi Denki Kabushiki Kaisha, Tokyo, Japan

[21] Appl. No.: 14,146

[22] Filed: Feb. 5, 1993

[30] Foreign Application Priority Data

Feb. 28, 1992 [JP] Japan ................... 4-043063

[51] Int. Cl.<sup>5</sup> .......................... G01C 3/00; B60T 7/16; H04N 7/18
[52] U.S. Cl. ....................... 356/1; 180/167; 250/201.6; 250/201.8; 348/139
[58] Field of Search ............... 356/1; 358/126, 107; 180/167; 250/201.6, 201.8

[56] References Cited

U.S. PATENT DOCUMENTS

| 4,926,346 | 5/1990 | Yokoyama | 364/364 |
| 4,987,357 | 1/1991 | Masaki | 318/340 |
| 5,131,740 | 7/1992 | Maekawa | 356/1 |
| 5,159,557 | 10/1992 | Ogawa | 364/460 |
| 5,237,406 | 8/1993 | Karasudani et al. | 358/105 |

FOREIGN PATENT DOCUMENTS

| 0474067 | 11/1992 | European Pat. Off. |
| 3642196 | 6/1988 | Fed. Rep. of Germany |
| 4006989 | 9/1990 | Fed. Rep. of Germany |
| 2611053 | 8/1988 | France |

Primary Examiner—Stephen C. Buczinski
Attorney, Agent, or Firm—Sughrue, Mion, Zinn, Macpeak and Seas

[57] ABSTRACT

An inter-vehicle distance detecting device comprising: a pair of image sensors on which an image of an object in front of a driving car is formed by a pair of optical systems; an image display means for displaying a first image information taken by one of the pair of image sensors; a window setting means for setting a plurality of windows partitioning a region of the image on the first image information; a distance detecting means for calculating respective distances from the driving car to the object surrounded by the respective windows by comparing a second image information in the respective windows set by the window setting means with a third image information taken by the other of the pair of image sensors corresponding to the second image information and by detecting a shift between the second image information and the third image information; a determining means for determining the object for measurement based on the distances to the respective windows provided by the distance detecting means; a gate setting means for setting a gate partitioning the region such that the gate approximately surrounds the object for measurement based on the distances corresponding to the object for measurement; a symmetry determining means for determining symmetry of a fourth image information surrounded by the gate and selected from the first image information and for obtaining a position of a symmetry line; and a predicting means for predicting the presence of a preceding car in front of the driving car by determining a first stability of a movement of the symmetry line provided by the symmetry determining means in the horizontal direction and by determining a second stability of the distances provided by a calculation result of the distance determining means over time.

2 Claims, 9 Drawing Sheets

INTER-VEHICLE DISTANCE DETECTING DEVICE

This invention relates to an inter-vehicle distance detecting device particularly for continuously measuring an inter-vehicle distance from a driving car to a preceding car, in an optical distance detecting device employing image sensors.

Figure 10:
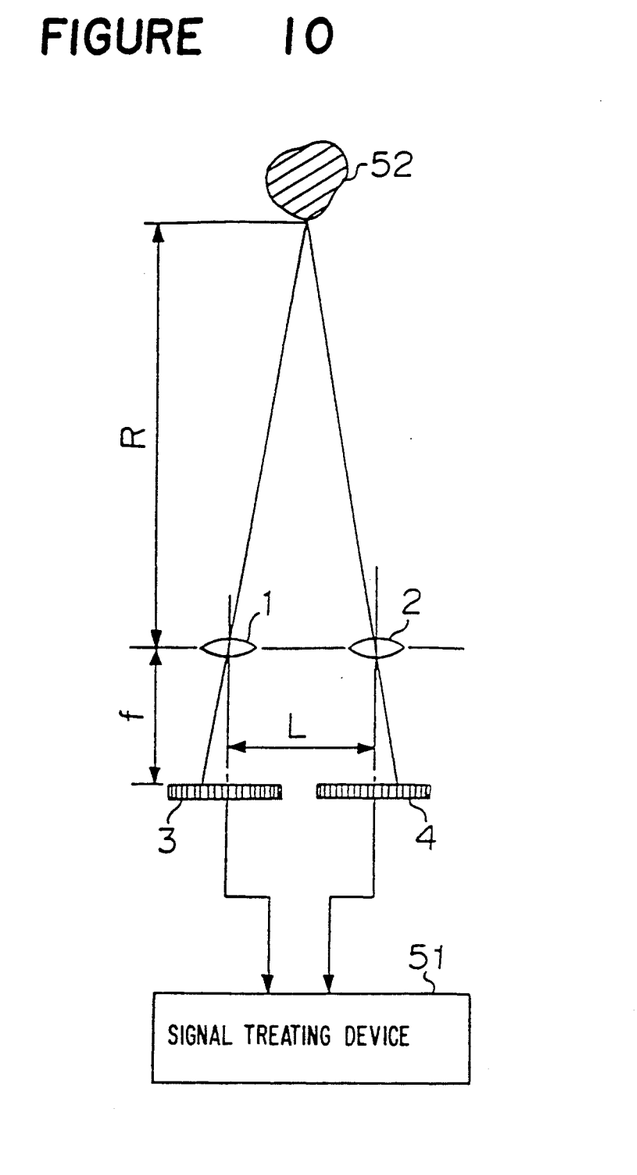
FIG. 10 is a construction diagram of a conventional distance detecting device.

FIG. 10 is a construction diagram of a conventional optical distance detecting device employing image sensors, disclosed in Japanese Examined Patent Publication No. 38085/1988, Japanese Examined Patent Publication No. 46363/1988 and the like, having two optical systems on the left and on the right as shown in FIG. 10.

In FIG. 10, reference numerals 1 and 2 designate left and right lenses disposed apart from each other by a base line length L, 3 and 4, image sensors disposed at positions apart from the lenses 1 and 2 by a focal length f, and 51, a signal treating device for calculating a distance from the driving car to an object 52 by employing image signals transmitted from the image sensors 3 and 4.

Next, an explanation will be given of the principle of distance detection from the driving car to the object 52. The image signals of the object 52 focused respectively on the image sensors 3 and 4 through the lenses 1 and 2, are electrically superposed by successively shifting one of the image signals with respect to the other thereof, in the signal treating device 51. The distance R from the driving car to the object 52 is obtained by the following equation (1) based on a shift quantity a whereby the above two image signals agree the most, by the principle of trigonometry.

$$R = f \times L / a \quad (1)$$

On the other hand, a method of tracking an image of a preceding car taken by image sensors or the like, is disclosed by Japanese Examined Patent Publication No. 3352/1985. According to the publication, an operator sets a tracking gate (window) surrounding a target to be tracked on a display image plane while observing the display image plane, thereby tracking the image of the target.

Since the conventional distance detecting device is constructed as above, wherein the distance from the driving car to the object is provided by comparing the image taken by the pair of left and right optical systems, in case of measuring the inter-vehicle distance from the driving car to a preceding car while running the driving car by mounting these systems on the driving car, when another car is running on the left hand side or the right hand side of the preceding car, the driver cannot recognize which inter-vehicle distance the device is measuring.

Furthermore, in case of starting the image tracking of a preceding car by a window or the like by setting an image tracking window by a joy stick or by a track ball while the driver is observing a display image plane in driving a car, the driver is accompanied by a danger of carelessness in watching in front of the driving car, or the like.

It is an object of the present invention to solve the above problem, and to provide an inter-vehicle distance detecting device capable of continuously measuring a distance from a driving car to a target, once the target is determined, even when the object is moving, so far as the object is in the scope of vision, and of finding out an object of the preceding car for measuring an inter-vehicle distance, even when a plurality of preceding cars are running. It is another object of the present invention to provide an inter-vehicle distance detecting device capable of automatically setting a tracking window for tracking the image of the preceding car, without observing a display image plane.

According to a first aspect of the present invention, there is provided an inter-vehicle distance detecting device comprising:

a pair of image sensors on which an image of an object in front of a driving car is formed by a pair of optical systems;

an image display means for displaying a first image information taken by one of the pair of image sensors;

a window setting means for setting a plurality of windows partitioning a region of the image on the first image information;

a distance detecting means for calculating respective distances from the driving car to the object surrounded by the respective windows by comparing a second image information in the respective windows set by the window setting means with a third image information taken by the other of the pair of image sensors corresponding to the second image information and by detecting a shift between the second image information and the third image information;

a determining means for determining the object for measurement based on the distances to the respective windows provided by the distance detecting means;

a gate setting means for setting a gate partitioning the region such that the gate approximately surrounds the object for measurement based on the distances corresponding to the object for measurement;

a symmetry determining means for determining symmetry of a fourth image information surrounded by the gate and selected from the first image information and for obtaining a position of a symmetry line; and a predicting means for predicting the presence of a preceding car in front of the driving car by determining a first stability of a movement of the symmetry line provided by the symmetry determining means in the horizontal direction and by determining a second stability of the distances provided by a calculation result of the distance determining means over time.

According to a second aspect of the present invention, there is provided an inter-vehicle distance detecting device comprising:

a pair of image sensors on which an image of an object in front of a driving car is formed by a pair of optical systems;

an image display means for displaying a first image information taken by one of the pair of image sensors;

a window setting means for setting a plurality of windows partitioning a region of the image on the first image information;

a distance detecting means for calculating respective distances from the driving car to the object surrounded by the respective windows by comparing a second image information in the respective windows set by the window setting means with a third image information taken by the other of the pair of image sensors corresponding to the second image information and by detecting a shift between the second image information and the third image information;

a determining means for determining the object for measurement based on the distances to the respective windows provided by the distance detecting means;

a gate setting means for setting a gate partitioning the region such that the gate approximately surrounds the object for measurement;

a symmetry determining means for determining symmetry of a fourth image information surrounded by the gate and selected from the first image information and for obtaining a position of a symmetry line;

a predicting means for predicting the presence of a preceding car in front of the driving car by determining a first stability of a movement of the symmetry line provided by the symmetry determining means in the horizontal direction and by determining a second stability of the distances provided by a calculation result of the distance determining means over time; and a tracking means for tracking an image of the preceding car predicted by the predicting means.

A microcomputer in this invention measures the distance from the driving car to the object caught by the windows under the principle of trigonometry, by comparing the top and the bottom corresponding images taken by the pair of image sensors, setting the image signal in the plurality of windows as a reference signal, and by electrically detecting the shift between the both images, and monitors the presence or the absence of a preceding car or other obstacle and its approximate position. Furthermore, the microcomputer finds out a position of the image having a good left and right symmetry on the display image frame, determines the position as a candidate of the position of the presence of the preceding car and predicts the presence of the preceding car and the position of the image of the preceding car on the display image plane based on these informations.

Furthermore, when the microcomputer predicts the position of the image of the preceding car on the display image plane, the microcomputer automatically sets a window having a size in correspondence to the distance from the driving car to the preceding car, and continuously detects the distance from the driving car to the preceding car by tracking the image of the preceding car by the tracking window.

EXAMPLE 1

Figure 1:
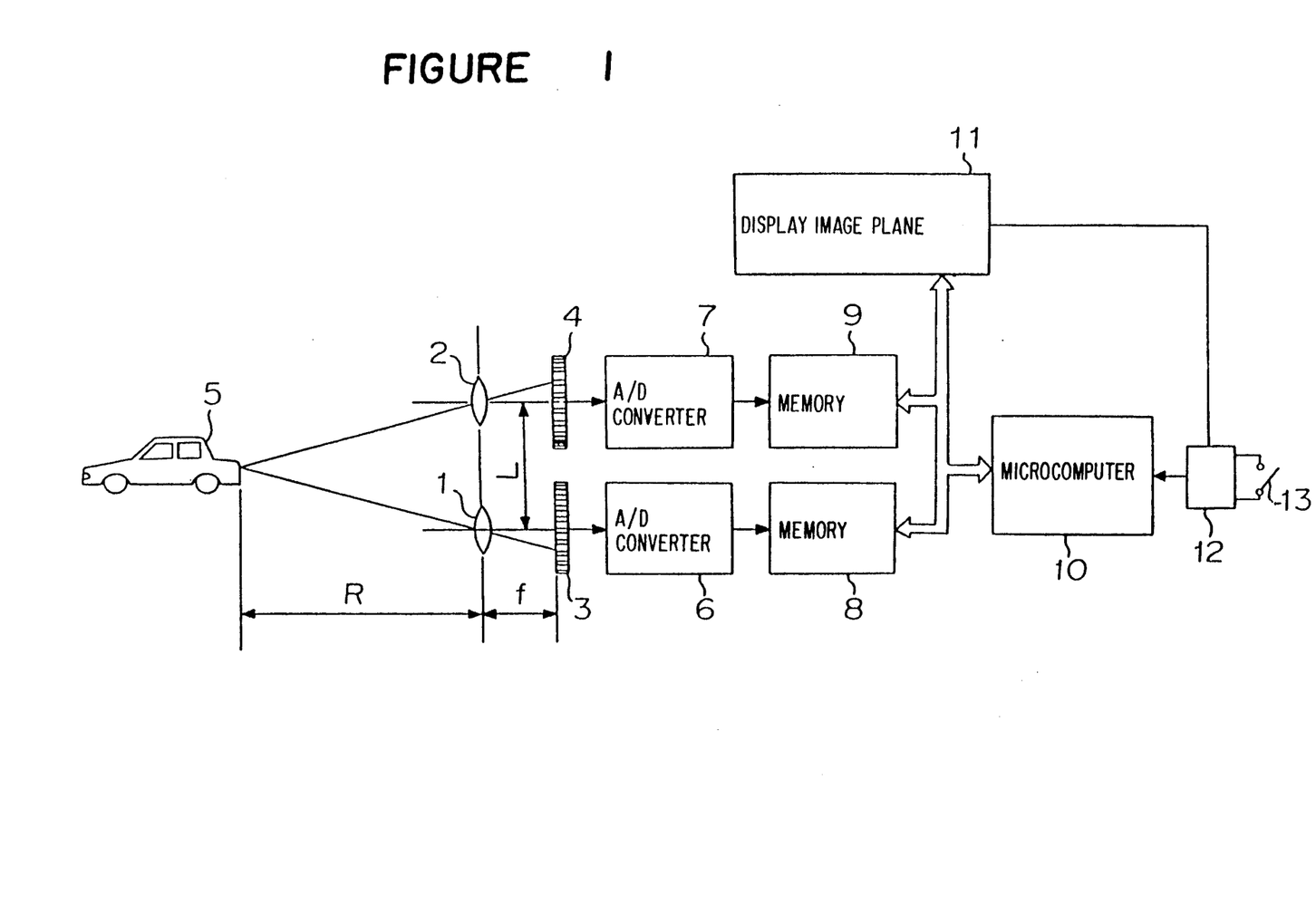
FIG. 1 is a block diagram showing the construction of an embodiment of an inter-vehicle distance detecting device according to the present invention.

An explanation will be given of an Example of an inter-vehicle distance detecting device of this invention in reference to the drawings, as follows. FIG. 1 is a block diagram showing the construction of a first Example of this invention. In FIG. 1, a part the same with that in the conventional distance detecting device shown in FIG. 10, is attached with the same notation. In FIG. 1, reference numerals 1 and 2 designate the lenses 3 and 4 composing the top and the bottom optical systems, 3 and 4, the two-dimensional image sensors provided respectively corresponding to the lenses 1 and 2 and 5, a preceding car to be tracked. Numerals 6 and 7 designate analog-to-digital (hereinafter, A/D) converter, 8 and 9, memories, 10, a microcomputer and 11, a display image plane for displaying an image taken by the top image sensor 4, which is controlled by the microcomputer 10. A numeral 12 designates a window setting device for setting windows for designating an object for measuring a distance from a driving car to the object, on the image, and 13, an image tracking instruction switch operated by a driver.

Figure 2:
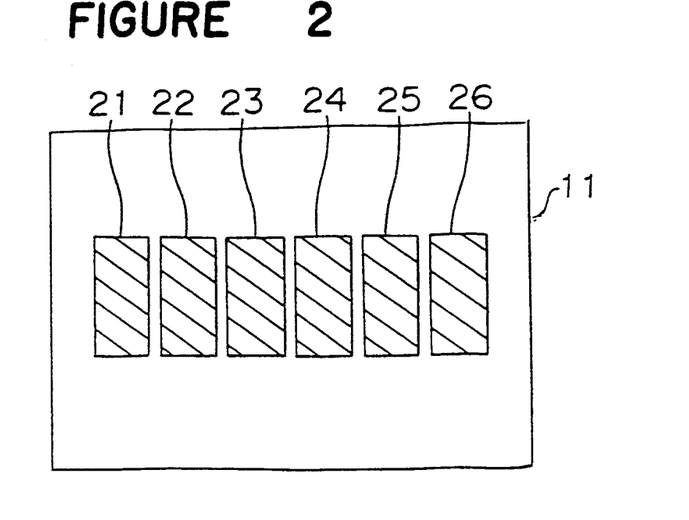
FIG. 2 is an explanatory diagram showing a state wherein a plurality of windows are set on a display image plane according to the present invention.
Figure 3:
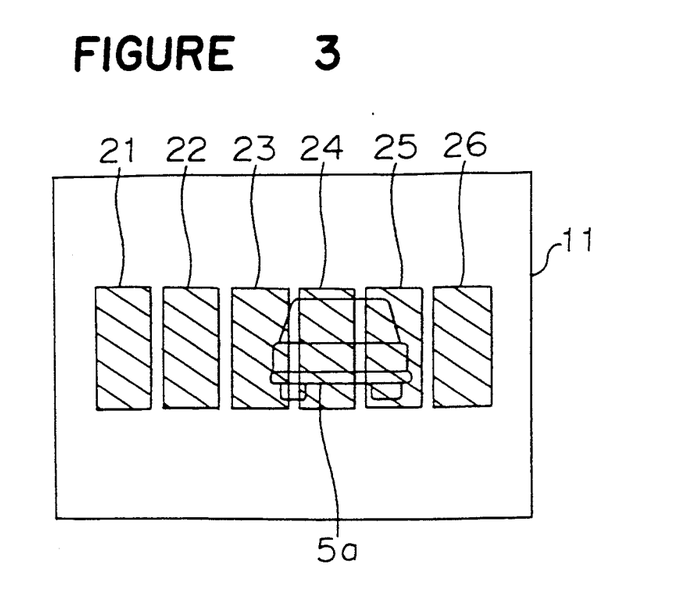
FIG. 3 is an explanatory diagram showing a state wherein an image of a preceding car enters the display image plane set by the plurality of windows according to the above embodiment.

Next, an explanation will be given of the operation. When the driver operates the image tracking instruction switch 13, as shown in FIG. 2, the window setting device 12 sets a plurality of windows for the distance measurement 21, 22, 23, 24, 25 and 26 at predetermined positions of the display image plane 11 wherein an image in front of the driving car taken by the top image sensor 4, is displayed. As shown in FIG. 3, when an image of a preceding car 5a enters the image, the image 5a can be caught by the plurality of windows 21 to 26 for the distance measurement.

Figure 5:
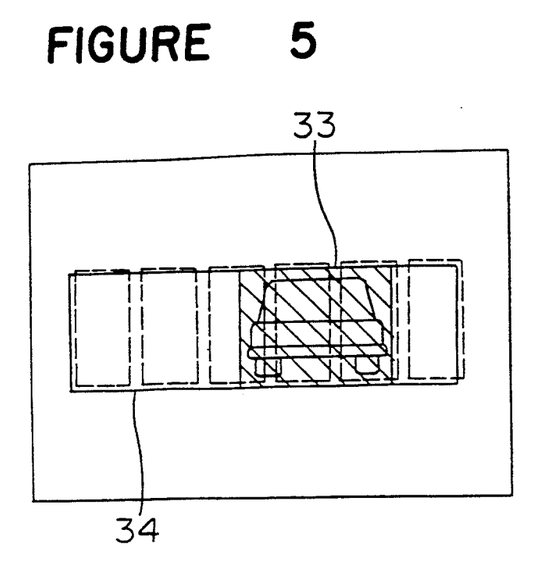
FIG. 5 is an explanatory diagram showing a gate and a scanning region for determining symmetry of an image of an object in the region wherein windows for measuring the distance in the above embodiment, are set.

By the way, when the object for the distance measurement is an automobile, the image thereof viewed from behind is often provided with a left and right symmetry. Therefore, employing such a characteristic, the presence of the preceding car and the position of the image of the preceding car on the displayed image plane, are specified by performing a determination of symmetry thereof in a region wherein the plurality of windows for the distance measurement are set and by having the distance information. First, as shown in FIG. 5, based on the distance information provided from the windows 23, 24 and 25 catching the preceding car, a gate 33 having a size in correspondence to the distance, is prepared. An evaluation of the symmetry is carried out by performing the calculation by the equation (3) shown below with respect to the image signal in the gate by shifting the gate 33 in the region 34 wherein the plurality of windows 21 through 26 for distance measurement are set, on the memory. S (i,j) designates the image signal in the symmetry determining region 34, which shows the grey level, for instance, in 256 grey scales. Notations m and n are respectively the width and the height of the gate 33, and w is the width of the symmetry determining region 34.

$$A_k = \sum_{j=0}^{n-1} \sum_{i=0}^{m/2-1} \{|S(k + i,j) - S(k + m - 1 - i,j)|\} \quad (3)$$

$$(k = 0, 1, 2, \ldots, w - m)$$

Figure 11:
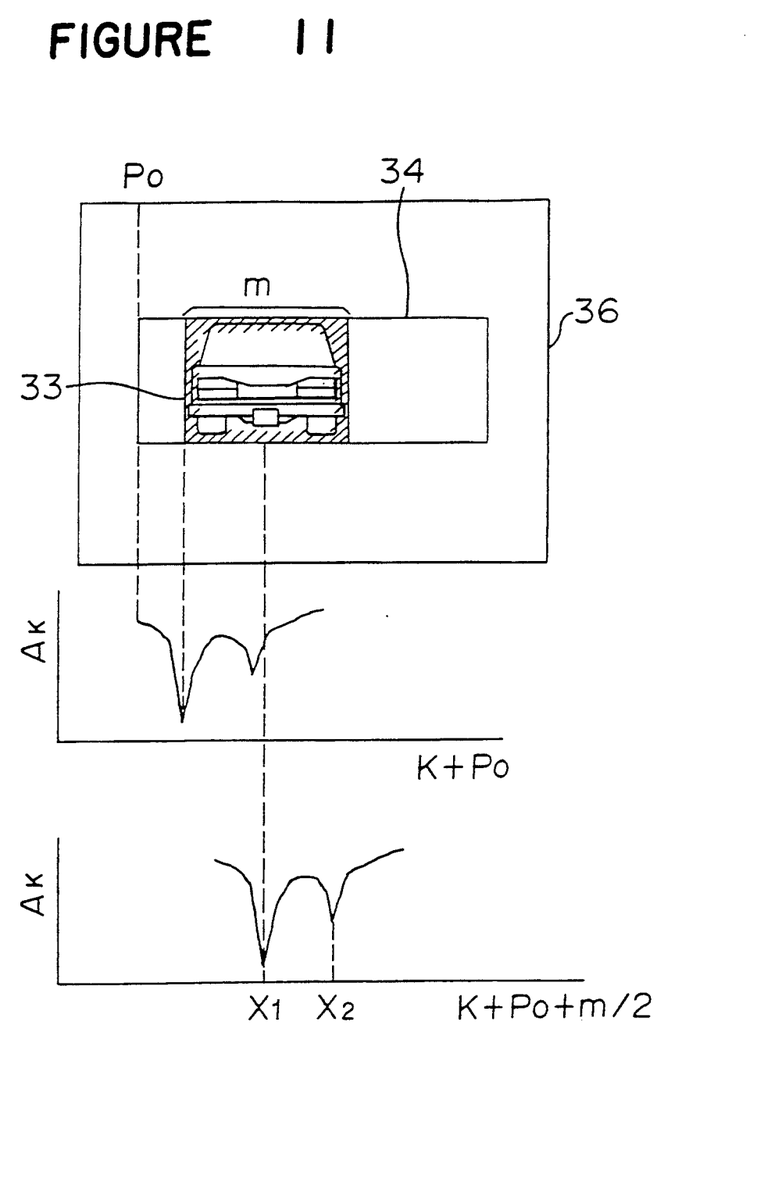
FIG. 11 is an explanatory diagram for finding out symmetry of an image in a display image plane.

The best symmetry is provided at the position wherein the value of $A_k$ is minimized by changing k in the above equation. However, actually there are several objects having good symmetry on the load, other than the preceding car. As shown in FIG. 11, according to the result of calculation by the above equation (3), there are a number of minimum values. It is determined that a candidate of the preceding car is present at the position of k (horizontal coordinate in the region 34) giving these minimum values. An absolute coordinate $X_n$ of a candidate point of the preceding car in the horizontal direction on the image plane 36, is given by the following equation (4) by determining the left end horizontal coordinate of the symmetry determining region 34 as $p_0$.

$$X_n = k + p_0 + m/2 \quad (4)$$

The microcomputer 10 selects a region corresponding to the above window 24 in the memory 8 wherein the image signal of the bottom image sensor 3 is memorized, and calculates a summation of absolute values of differences of signals at every top and bottom pixel by successively shifting the image signal of the memory 8 with respect to the above reference image signal, pixel by pixel. Accordingly, the position of the image which fits the image in the window 24 the most, is provided by successively shifting the image pixel by pixel.

Figure 4:
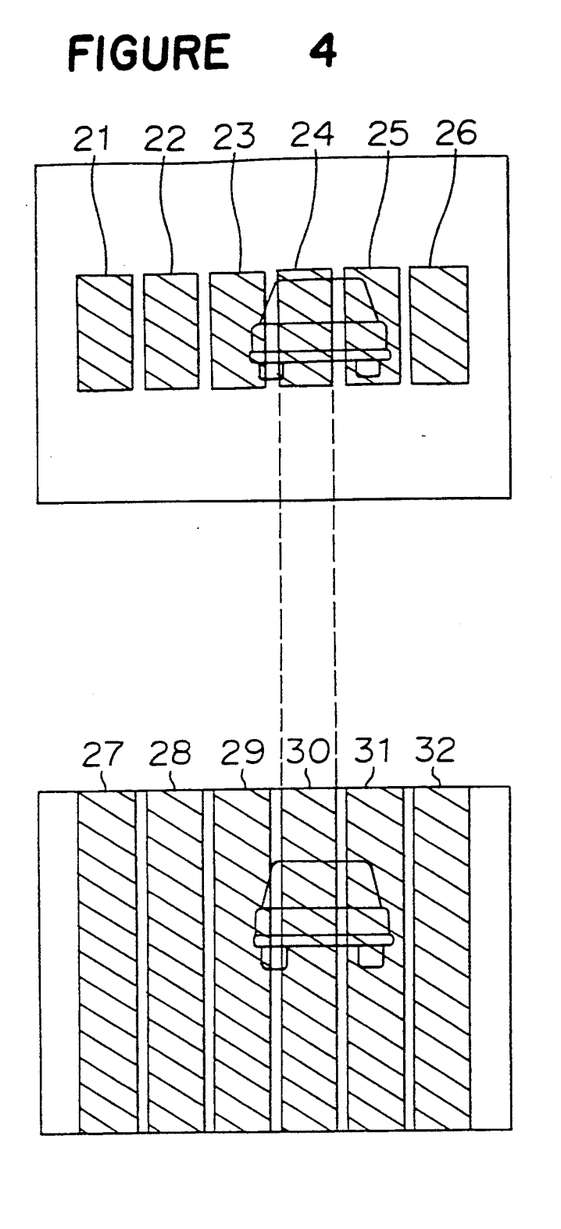
FIG. 4 is an explanatory diagram showing a region of an image which is compared with a reference image in the respective windows in the above embodiment.

At this occasion, as shown in FIG. 4, the region of the memory 8 which is related to the calculation, is a region 30 corresponding to the position of the window 24. A shift quantity of the pixel which minimizes the summation of the absolute values of the differences of signals, which is obtained by comparing the top and the bottom pixels, is determined to be n pixels, the pitch of the pixel, P, the base line length of the optical system, L, and the focal length of the lenses 1 and 2, f. Then, the distance R from the driving car to the preceding car is provided by the following equation (2).

$$R = f \times L / n \times P \quad (2)$$

In this way, the distance from the driving car to the object in the window 24 can be measured.

Figure 7:
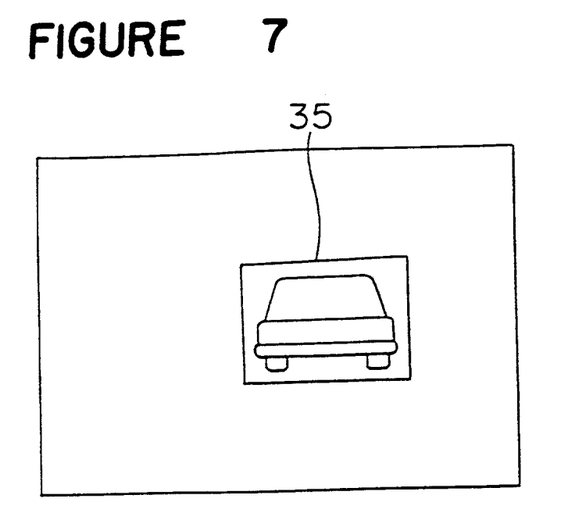
FIG. 7 is an explanatory diagram showing a state wherein a window is set for the image of the preceding car in the above embodiment.
Figure 12A:
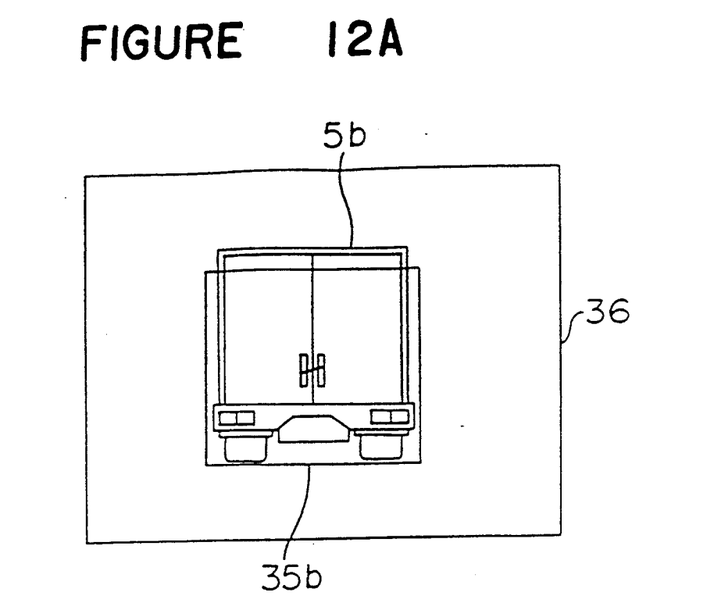
FIGS. 12(a) and 12(b) exemplify the size of a window which changes according to the size of the image.
Figure 12B:
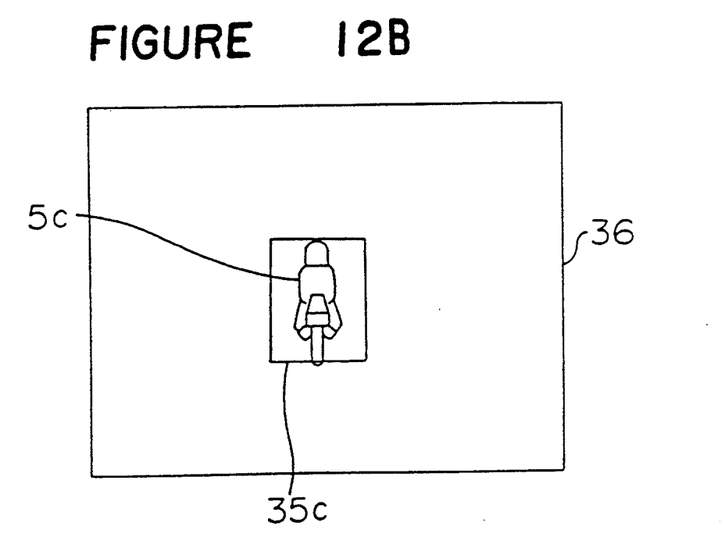

As stated above, when a window 35 for tracking surrounding the image 5a of the preceding car is set, the image tracking operation of the image 5a of the preceding car by the window 35 for tracking, is initiated (FIG. 7). The image tracking operation is similar to that in conventional devices disclosed in Japanese Examined Patent Publication No. 33352/1985, or Japanese Examined Patent Publication No. 35305/1989 and a detail explanation will be omitted. Furthermore, normally, as a window for catching an image of a preceding car which is an object for tracking and for distance measurement, a standard window corresponding to an ordinary passenger car is set. However, in the actual running, a large-sized vehicle or a small-sized vehicle such as a motor cycle may be the preceding car. Therefore, a large window, a medium (standard) window and a small window are prepared, and a driver can select a suitable window by manual operation in accordance with the kind of the preceding car after the tracking is started, as shown in FIGS. 12(a) and 12(b).

As stated above, as shown in FIG. 4, with respect to the object caught by the windows for distance measurement 21 through 26 which are set in the display image plane 11, the image comparison is performed in calculation regions 27, 28, 29, 30, 31 and 32 respectively corresponding to these windows, and distances from the driving car to the object can be measured respectively for the windows for distance measurement 21, 22, 23, 24, 25 and 26.

The measurement values of the distances with respect to the windows for distance measurement 21 through 26 measured as above, are compared by the microcomputer 10, and windows showing approximately the same measurement values having comparatively short distances are selected among the contiguous windows.

That is to say, the windows for distance measurement 23, 24 and 25 showing the distances shorter than that of the background, are selected. When the distance measurement values of the windows for distance measurement 23, 24 and 25 do not change rapidly over time, it is predicted that a preceding car is present at the position wherein these windows are set.

When the object for distance measurement is an automobile, the image thereof viewed from behind the automobile are often symmetric in the left and right direction, generally. Accordingly, employing such a characteristic, the symmetry is determined in a region wherein the plurality of the windows for distance measurement, are set, and the presence of the preceding car and the position of the image of the preceding car on the display image plane, are specified by the symmetry determination along with the distance information.

First, as shown in FIG. 5, in accordance with the distance information provided by the windows 23, 24 and 25 catching the preceding car, a gate 33 having the size corresponding with the distance, is prepared. The evaluation of the symmetry is carried out by performing the calculation by the following equation (5) with respect to the image signal in the gate 33, by shifting the gate 33 in a region 34 wherein the plurality of windows for distance measurement 21 through 26, are set in the memory. S (i,j) in equation (5) is the image signals in the region 34 for determining the symmetry, which, for instance, represents a grey value in 256 grey scales. Furthermore, notations m and n are respectively the width and the height of the gate 33, and W, the width of the region 34 for determining the symmetry.

$$A_k = \sum_{j=0}^{n-1} \sum_{i=0}^{m/2-1} \{|S(k + i,j) - S(k + m - 1 - i,j)|\} \quad (5)$$

$$(k = 1, 2, \ldots, w - m)$$

In equation (5), the symmetry has the best value at a position wherein the value of $A_k$ is minimized. However, actually, there are a number of objects having good symmetries on the road other than the preceding car. The calculation result of equation (5) has a number of minimum values, and the positions having these minimum values are candidates of the position for the presence of the preceding car.

Although a number of candidates of the preceding car may be pointed out as above, the preceding car to be tracked on the image, does not abruptly move in the horizontal direction, and the inter-vehicle distance from the driving car to the preceding car, does not change abruptly over time. Therefore, by determining a stability of movement of these candidates in the horizontal direction over time, and a stability of the distance information provided by the windows for distance measurement, the preceding car can be selected among the candidates. In this way, the position of the image of the preceding car on the display image plane 11, can be specified.

Figure 6:
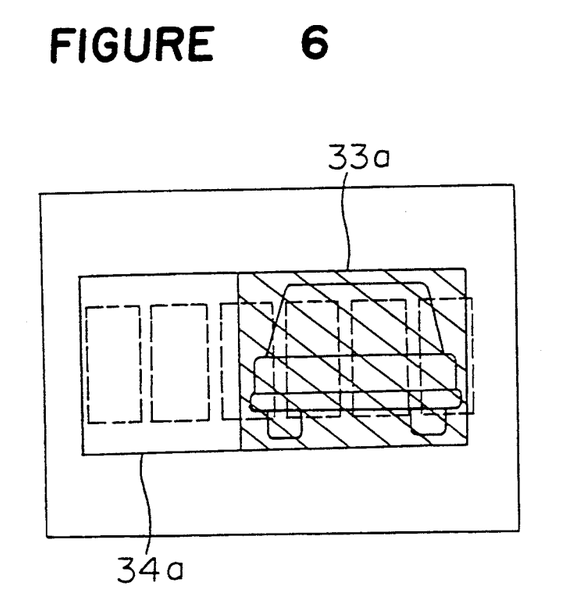
FIG. 6 is an explanatory diagram showing a gate and a scanning region thereof for determining an image of an object in the region wherein the windows for measuring the distance in the above embodiment, are set.
Figure 8:
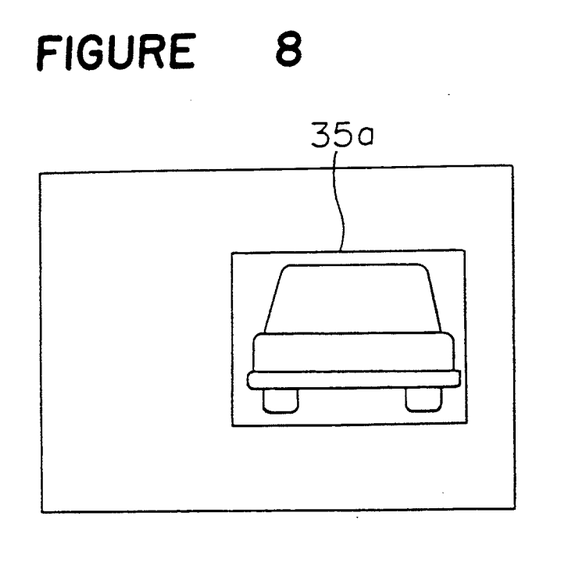
FIG. 8 is an explanatory diagram showing a state wherein a large tracking window is set for the image of the preceding car in the above embodiment.

Next, as shown in FIG. 7, a tracking window 35 is set by the window setting device 12 at the position specified on the display image plane 11. The size of the tracking window 35 is the same with that of the gate 33 which has been set in accordance with the measurement values of the windows for distance measurement 23, 24 and 25. That is to say, since the size of the image of the preceding car 5a varies in accordance with the distance from the driving car to the preceding car, when the distance measurement value is comparatively large, the tracking window 35 having small dimension is set (FIG. 7). When the distance measurement value is comparatively small, a large gate 33a for determining the symmetry, is prepared as shown in FIG. 6. At this occasion, the region for determining the symmetry is designated by 34a in FIG. 6. Accordingly, a large tracking window 35a is set as shown in FIG. 8.

When the tracking window 35 surrounding the image of the preceding the image of the preceding car 5a is set as above, the image tracking action of the image of the preceding car 5a by the tracking window 35, is started. This image tracking action is the same with that in a conventional device disclosed in Japanese Examined Patent Publication No. 33352/1985, or Japanese Examined Patent Publication No. 35305/1989, and a detailed explanation will be omitted.

Next, the inter-vehicle distance from the driving car to the preceding car 5 caught by the tracking window 35, is detected. This inter-vehicle distance is detected by the principle of trigonometry wherein the top and bottom image signals are compared as in the method explained in the above equation (2), determining the image signal in the tracking window 35 tracking the image of the preceding car 5a as the reference image signal for calculating the inter-vehicle distance. Wherever the image of the preceding car 5a moves in the display image plane 11, the tracking window 35 tracks the image of the preceding car 5a, and continuously detects the inter-vehicle distance from the driving car to the preceding car 5.

Figure 9:
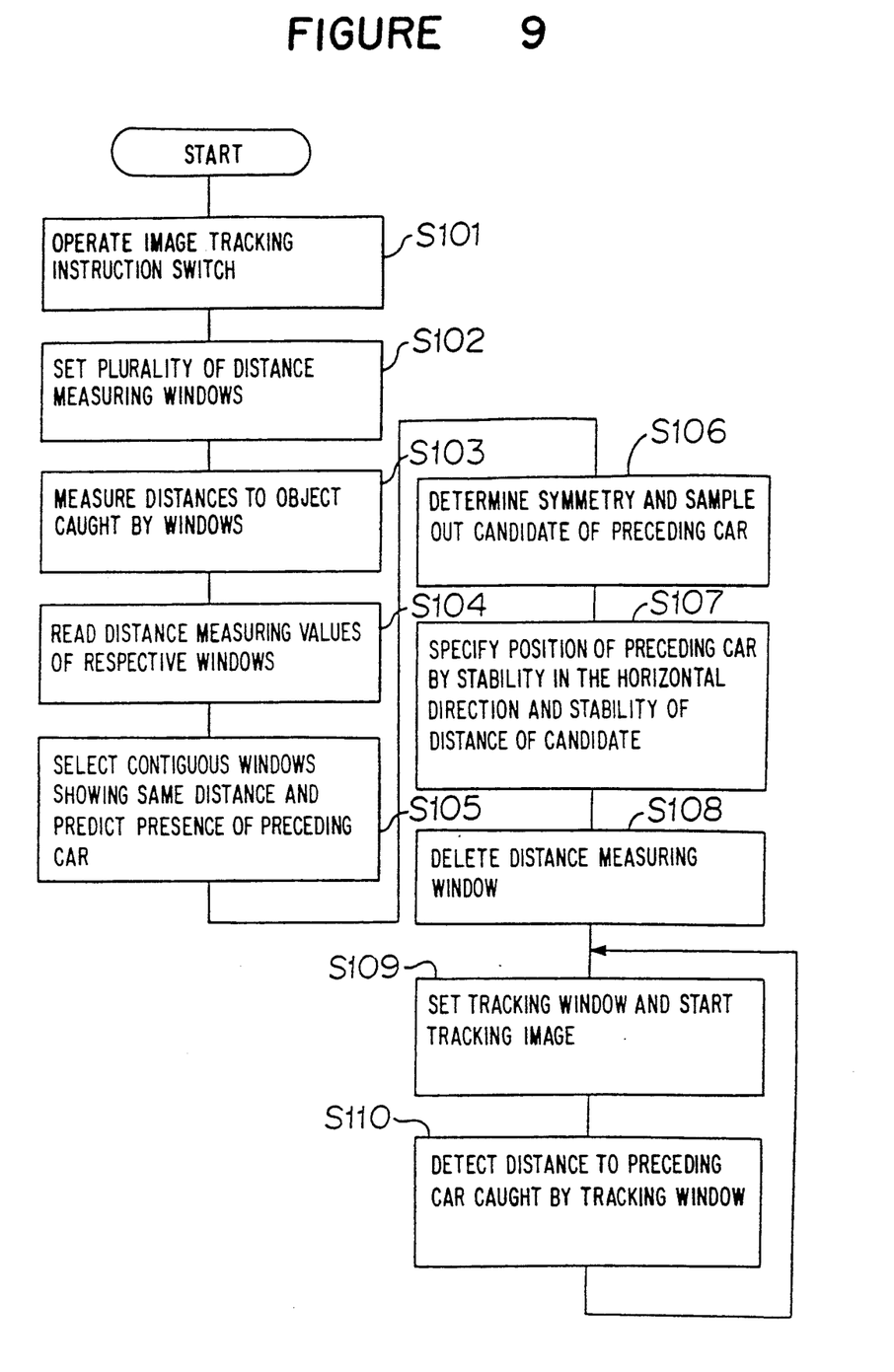
FIG. 9 is a flowchart showing the operational procedure of an embodiment of the present invention.

FIG. 9 is a flowchart showing the above operational procedure. First, the driver operates the image tracking instruction switch 13 in a state wherein the preceding car is present in front of the driving car (Step S101). The microcomputer 10 inputted with an operation signal, controls the window setting device 12 and sets a plurality of windows for distance measurement 21 through 26 at predetermined positions on the display image plane 11 (Step S102).

Next, the operation measures the distances from the driving car to the object caught by the respective windows (Step S103). The operation reads the measured distance information and the positions of the windows in the memory (Step S104). The operation selects contiguous windows showing the same measured value having comparative short distances, and predicts the presence of the preceding car (Step S105).

Next, the operation prepares the gate for determining symmetry having the size in accordance with the measured distance, and samples out the candidates of the preceding car (Step S106). The operation specifies the position of the image of the preceding car by determining the stability of movement of the candidates over time and the stability of the measured distance from the driving car to the candidates over time (Step S107).

Furthermore, the operation deletes the windows for distance measurement which have been displayed until that time (Step S108). The operation sets the tracking window having the size in accordance with the inter-vehicle distance at the position selected as above (Step S109). Thereafter, the operation continuously detects the inter-vehicle distance from the driving car to the preceding car caught by the tracking window (Step S110).

In the explanation of the above embodiments, the two optical systems are disposed on the top and on the bottom. However, the systems can be arranged on the left and on the right or on a slanted plane with the same effect.

As stated above, according to the first aspect of the present invention, the image of the preceding car in front of the driving car is taken. The plurality of windows are set at the predetermined positions on the display image plane displaying the image taken by these image sensors. The distances from the driving car to the object caught by these windows, are detected. The symmetry in the left and right direction is determined. The stability of movement of the determined symmetry point in the horizontal direction, and the stability of the detected distance information, are determined. Accordingly, the invention has an effect wherein the presence of the preceding car and the position thereof on the display image plane can be predicted.

Furthermore, according to the second aspect of the present invention, the tracking window surrounding the image of the preceding car is newly set at the position of the presence of the image of the specified preceding car. The distance from the driving car to the preceding car caught by the tracking window, is detected. Therefore, the tracking window for tracking the image of the preceding car, is automatically set. Furthermore, since the image of the preceding car is displayed on the display image plane, this invention has an effect wherein driver can be informed of the preceding car for detecting the inter-vehicle distance.

I claim:

1. An inter-vehicle distance detecting device comprising:
   a pair of image sensors on which an image of an object in front of a driving car is formed by a pair of optical systems;
   an image display means for displaying a first image information taken by one of the pair of image sensors;
   a window setting means for setting a plurality of windows partitioning a region of the image on the first image information;

a distance detecting means for calculating respective distances from the driving car to the object surrounded by the respective windows by comparing a second image information in the respective windows set by the window setting means with a third image information taken by the other of the pair of image sensors corresponding to the second image information and by detecting a shift between the second image information and the third image information;

a determining means for determining the object for measurement based on the distances to the respective windows provided by the distance detecting means;

a gate setting means for setting a gate partitioning the region such that the gate approximately surrounds the object for measurement based on the distances corresponding to the object for measurement;

a symmetry determining means for determining symmetry of a fourth image information surrounded by the gate and selected from the first image information and for obtaining a position of a symmetry line; and a predicting means for predicting the presence of a preceding car in front of the driving car by determining a first stability of a movement of the symmetry line provided by the symmetry determining means in the horizontal direction and by determining a second stability of the distances provided by a calculation result of the distance determining means over time.

2. An inter-vehicle distance detecting device comprising:

a pair of image sensors on which an image of an object in front of a driving car is formed by a pair of optical systems;

an image display means for displaying a first image information taken by one of the pair of image sensors;

a window setting means for setting a plurality of windows partitioning a region of the image on the first image information;

a distance detecting means for calculating respective distances from the driving car to the object surrounded by the respective windows by comparing a second image information in the respective windows set by the window setting means with a third image information taken by the other of the pair of image sensors corresponding to the second image information and by detecting a shift between the second image information and the third image information;

a determining means for determining the object for measurement based on the distances to the respective windows provided by the distance detecting means;

a gate setting means for setting a gate partitioning the region such that the gate approximately surrounds the object for measurement;

a symmetry determining means for determining symmetry of a fourth image information surrounded by the gate and selected from the first image information and for obtaining a position of a symmetry line;

a predicting means for predicting the presence of a preceding car in front of the driving car by determining a first stability of a movement of the symmetry line provided by the symmetry determining means in the horizontal direction and by determining a second stability of the distances provided by a calculation result of the distance determining means over time; and a tracking means for tracking an image of the preceding car predicted by the predicting means.

* * * * *